US011593169B2

United States Patent
Chisnall et al.

(10) Patent No.: US 11,593,169 B2
(45) Date of Patent: Feb. 28, 2023

(54) MEMORY DEALLOCATION ACROSS A TRUST BOUNDARY

(71) Applicant: Microsoft Technology Licensing, LLC, Redmond, WA (US)

(72) Inventors: David Thomas Chisnall, Cambridge (GB); Matthew John Parkinson, Cambridge (GB); Sylvan Wesley Clebsch, Cambridge (GB); Roy Schuster, London (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 533 days.

(21) Appl. No.: 16/503,449

(22) Filed: Jul. 3, 2019

(65) Prior Publication Data

US 2021/0004271 A1 Jan. 7, 2021

(51) Int. Cl.
*G06F 9/455* (2018.01)
*G06F 9/50* (2006.01)
(Continued)

(52) U.S. Cl.
CPC .......... *G06F 9/5016* (2013.01); *G06F 9/355* (2013.01); *G06F 9/455* (2013.01);
(Continued)

(58) Field of Classification Search
CPC .. G06F 9/455; G06F 9/45533; G06F 9/45558; G06F 2009/45583;
(Continued)

(56) References Cited

U.S. PATENT DOCUMENTS 6,823,472 B1 * 11/2004 DeKoning ............ G06F 15/167
714/10
2007/0079090 A1 * 4/2007 Rajagopal ........... G06F 12/1491
711/163
(Continued)

FOREIGN PATENT DOCUMENTS

WO   2017142525 A1   8/2017

OTHER PUBLICATIONS

Buntinas et al, "Design and Evaluation of Nemesis, a Scalable, Low-Latency, Message-Passing Communication Subsystem", Proceedings of the Sixth IEEE International Symposium on Cluster Computing and the Grid (CCGRID'06), IEEE, pp. 1-10 (Year: 2006).*

(Continued)

*Primary Examiner* — Charles M Swift
(74) *Attorney, Agent, or Firm* — Barta, Jones & Foley, PLLC

(57) ABSTRACT

A method of memory deallocation across a trust boundary between a first software component and a second software component is described. Some memory is shared between the first and second software components. An in-memory message passing facility is implemented using the shared memory. The first software component is used to deallocate memory from the shared memory which has been allocated by the second software component. The deallocation is done by: taking at least one allocation to be freed from the message passing facility; and freeing the at least one allocation using a local deallocation mechanism while validating that memory access to memory owned by data structures related to memory allocation within the shared memory are within the shared memory.

20 Claims, 7 Drawing Sheets

(51) Int. Cl.
*G06F 9/54* (2006.01)
*G06F 9/355* (2018.01)
*G06F 21/57* (2013.01)

(52) U.S. Cl.
CPC ...... *G06F 9/45533* (2013.01); *G06F 9/45558* (2013.01); *G06F 9/50* (2013.01); *G06F 9/5005* (2013.01); *G06F 9/5022* (2013.01); *G06F 9/54* (2013.01); *G06F 9/544* (2013.01); *G06F 9/546* (2013.01); *G06F 21/572* (2013.01); *G06F 2009/45583* (2013.01); *G06F 2009/45587* (2013.01)

(58) Field of Classification Search
CPC ............. G06F 2009/45587; G06F 9/50; G06F 9/5005; G06F 9/5016; G06F 9/5022; G06F 9/54; G06F 9/544; G06F 9/546; G06F 9/355; G06F 21/572
See application file for complete search history.

(56) References Cited

U.S. PATENT DOCUMENTS

| | | | | |
|---|---|---|---|---|
| 2015/0288659 | A1* | 10/2015 | Lukacs | G06F 21/575 713/2 |
| 2016/0171147 | A1* | 6/2016 | Chen | G06F 30/39 716/134 |
| 2016/0285970 | A1* | 9/2016 | Cai | H04L 69/162 |
| 2017/0075856 | A1 | 3/2017 | Suzue et al. | |
| 2017/0371570 | A1* | 12/2017 | Wokhlu | G06F 12/084 |
| 2019/0171379 | A1* | 6/2019 | Van Riel | G06F 3/0643 |

OTHER PUBLICATIONS

"Jemalloc Memory Allocaror", Retrieved from: http://jemalloc.net/, Jun. 28, 2019, 2 Pages.
"Optimization Tricks used by the Lockless Memory Allocator ", Retrieved from: https://locklessinc.com/articles/allocator_tricks/, Jun. 27, 2019, 9 Pages.
"Rpmalloc", Retrieved from: https://github.com/mjansson/rpmalloc, Jun. 28, 2019, 7 Pages.
"The FreeBSD Project", Retrieved from: https://www.freebsd.org/, Jun. 25, 2019, 2 Pages.
"Thread Buiolding Blocks (TBB)", Retrieved from: https://www.threadingbuildingblocks.org/tutorial-intel-tbb-scalablememory-allocator, 2017, 2 Pages.
Berger, et al., "Hoard: A Scalable Memory Allocator for Multithreaded Applications", In Proceedings of the Ninth International Conference on Architectural Support for Programming Languages and Operating Systems, Nov. 12, 2000, pp. 117-128.
Clebsch, et al., "Deny Capabilities for Safe, Fast Actors", In Proceedings of the 5th International Workshop on Programming Based on Actors, Agents, and Decentralized Control, Oct. 26, 2015, 12 Pages.
Clebsch, Sylvan, "Pony: co-designing a type system and a runtime", Thesis submitted to the n Computing of Imperial College London and the Diploma of Imperial College London, Oct. 2017, 175 Pages.
Cooper, et al., "Benchmarking Cloud Serving Systems with YCSB", In Proceedings of the 1st ACM symposium on Cloud computing, Jun. 10, 2010, pp. 143-154.
Dragojevic, et al., "No Compromises: Distributed Transactions with Consistency, Availability, and Performance", In Proceedings of the 25th Symposium on Operating Systems Principles, Oct. 4, 2015, pp. 54-70.
Dragojevic,, et al., "FaRM: Fast Remote Memory", In Proceedings of the 11th US EN IX Conference on Networked Systems Design and Implementation, Apr. 2, 2014, pp. 401-414.
Evans, Jason, "A Scalable Concurrent Malloc(3) Implementation for FreeBSD.", In Prococeedings of the bsdcan conference, Apr. 16, 2006, 14 Pages.
Ghemawat, Sanjay, "TCMalloc: Thread—Caching Malloc ", Retrieved from: https://gperftools.github.io/gperftools/tcmalloc.html, Jun. 27, 2019, 7 Pages.
Gloger, Wolfram, "Wolfram Gloger's Malloc Homepage", Retrieved from: http://www.malloc.de/en/, May 31, 2006, 1 Page.
Herlihy, et al., "Axioms for Concurrent Objects", In Proceedings of the 14th ACM SIGACT-SIGPLAN symposium on Principles of programming languages, Jan. 2, 1987, pp. 13-26.
Kuszmaul, Bradley, "SuperMalloc: A Super Fast Mulithreaded Malloc for 64-bit Machines ", In ACM SIGPLAN Notices, Jun. 14, 2015, pp. 41-55.
Martin, et al., "Fast, Multicore-Scalable, Low-Fragmentation Memory Allocation through Large Virtual Memory and Global Data Structures", In Proceedings of ACM SIGPLAN Notices 50, No. 10, Dec. 18, 2015, pp. 451-469.
McKusick, et al., "The Design and Implementation of the FreeBSD Operating System (2nd ed.)", In Proceedings of Pearson Education, 2014, 129 Pages.
Michael, Maged, "Scalable Lock-Free Dynamic Memory Allocation", In Proceedings of the ACM SIGPLAN Notices, vol. 39, Issue 6, Jun. 9, 2004, 12 Pages.
Shamis, et al., "Fast General Distributed Transactions with Opacity", In Proceedings of the 2019 International Conference on Management of Data, Jun. 14, 2019, pp. 433-448.
Shamis, et al., "Tech Showcase: FaRM—Microsoft Research", Retrieved from: https://www.microsoft.com/en-us/research/video/farm/, Aug. 2, 2018, Pages.
Treiber, et al., "Systems Programming: Coping with Parallelism.", In Proceedings of International Business Machines Incorporated, Thomas J Watson Research Cente, Apr. 23, 1986, 46 Pages.
"International Search Report and Written Opinion Issued in PCT Application No. PCT/US20/036723", dated Sep. 16, 2020, 14 Pages.

* cited by examiner

MEMORY DEALLOCATION ACROSS A TRUST BOUNDARY

BACKGROUND

A trust boundary is found between two software components where there is a difference between how much the individual software components are trusted by each other. In an example, the two software components are both trusted by a third party but the two software components do not trust one another. In another example, a first software component is trusted by a third party and a second software component is not trusted by the same third party.

Typically, where there is a trust boundary between two software components a cross-domain communication mechanism is used to communicate between the two software components and the cross-domain communication mechanism is expensive in terms of compute cycles and/or introduces latency. In an example, in the case where the trust boundary involves a transition from a trusted execution environment state to an insecure state while deploying side channel mitigations, the cross-domain communication mechanism introduce around 40,000 compute cycles. In another example where the trust boundary is across two virtual machines the cross-domain communication mechanism involves use of a scheduler which introduces latency of around 10 milliseconds.

The embodiments described below are not limited to implementations which solve any or all of the disadvantages of known methods for memory deallocation across a trust boundary.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

A method of memory deallocation across a trust boundary between a first software component and a second software component is described. Some memory is shared between the first and second software components. An in-memory message passing facility is implemented using the shared memory. The first software component is used to deallocate memory from the shared memory which has been allocated by the second software component. The deallocation is done by: taking at least one allocation to be freed from the message passing facility; and freeing the at least one allocation using a local deallocation mechanism while validating that memory access to memory owned by data structures related to memory allocation within the shared memory are within the shared memory.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example are constructed or utilized. The description sets forth the functions of the example and the sequence of operations for constructing and operating the example. However, the same or equivalent functions and sequences may be accomplished by different examples.

Typically, where there is a trust boundary between two software components a cross-domain communication mechanism is used to communicate between the two software components and the cross-domain communication mechanism is expensive in terms of compute cycles and/or introduces latency. The cross-domain communication mechanism also imposes synchronization. As a result it is problematic to deallocate memory across a trust boundary, that is, to use a first software component to deallocate memory that a second software component has allocated, where there is a trust boundary between the two software components. Since synchronization is imposed it is difficult for the two software components to run concurrently without needing to synchronize for memory allocation events.

Figure 1:
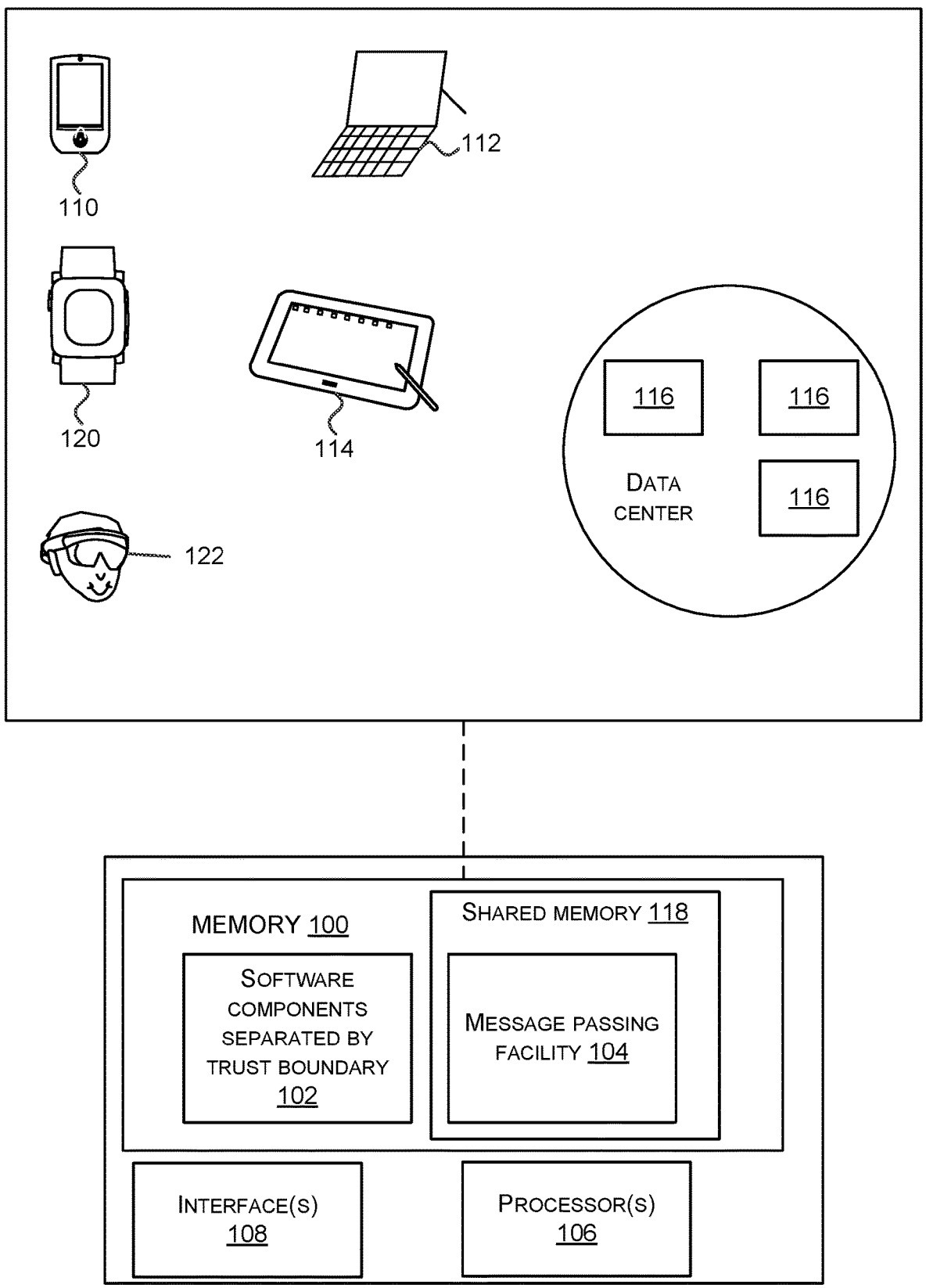
FIG. 1 is a schematic diagram of various different types of computing device in which there are software components separated by a trust boundary and where the technology of the present disclosure is deployable.

Trust boundaries occur between software components in many types of computing device such as those illustrated in FIG. 1 which are end user devices such as smart phone 110, laptop computer 112, smart watch 120, tablet computer 114, head worn augmented reality computing device 122; and also enterprise computing devices and cloud computing devices such as compute nodes 116 in a data center. Note that the computing devices illustrated in FIG. 1 are examples and are not intended to limit the scope of the technology.

Each of the computing devices of FIG. 1 comprises various components which are described in detail with reference to FIG. 7. FIG. 1 shows some but not all of these components of a single computing device for clarity. FIG. 1 shows that each of the computing devices has memory 100 storing software components 102 which share a shared memory 118 and which are separated by a trust boundary. The shared memory 118 stores a message passing facility 104. Each computing device also has one or more processors 106 and one or more interfaces 108 such as a communications interface to enable the computing device to communicate with external memory, other computing devices, communications networks and so on.

The technology of the present disclosure has at least two software components 102 which are separated by a trust boundary and non-limiting examples of these software components are given with reference to FIGS. 2A to 2D below. Each software component executes one or more threads. A thread is a serial execution of instructions on one side of the trust boundary and which does not flow across the trust boundary.

The software components 102 share some memory shown at 118 in FIG. 1. Each software component 102 is able to allocate and deallocate blocks of memory in the shared memory 118. Each software component 102 has at least one allocator for the shared memory. If a software component has memory outside the shared memory then the software component has at least one allocator for the memory outside the shared memory. An allocator is a software component that is responsible for partitioning memory into objects that can be used by other components and reusing them once they have been returned.

The shared memory 118 is used to implement a message passing facility 104. The message passing facility enables messages to be sent between threads either side of a trust boundary without using a conventional cross-domain communication mechanism. It uses in-memory operations so that the message passing facility is very efficient as compared with using a conventional cross-domain communication mechanism. By using the message passing facility as described herein it is possible to efficiently allocate and deallocate memory across a trust boundary in a secure manner. The technology is usefully deployed in a wide variety of scenarios, some of which are described with reference to FIGS. 2A to 2D.

The software components 102 are separated by a trust boundary. Some of the memory visible to the software components 102 is shared (shared memory 118 which is a region of memory 100) between two or more software components. There is a message-passing facility in the shared memory 118 region. Allocations are performed within the shared memory 118 by any of the software components 102 that share the shared memory 118. Allocations within the shared memory 118 are deallocated by any of the software components 102 that share the shared memory 118, irrespective of which software component freed it (by using the message-passing facility 104 to pass it back to the owning software component).

Deallocation comprises at least two operations which are: marking a piece of memory as no longer in use; and making a piece of memory available for reuse. In a typical C-style programming environment, these two operations are typically conflated (a call to free( ) usually both marks an object as unused and immediately makes it available for reuse). The technology of the present disclosure splits those into two steps, where the first either triggers the second immediately for local allocations or adds it to a message queue for remote allocations so that a remote allocator will make it available for reuse later.

Figure 2A:
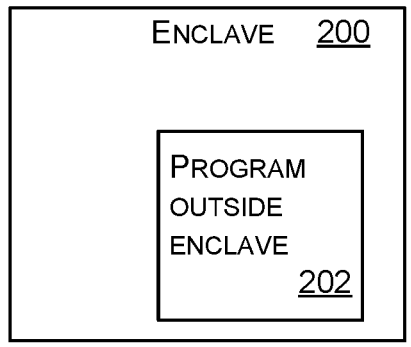
FIG. 2A is a schematic diagram of an enclave and a program outside the enclave.

FIG. 2A shows the situation where the first software component is in an enclave 200 and the second software component is a program 202 outside the enclave. The enclave 200 has access to some private memory which is represented by the rectangle depicting the enclave 200 in FIG. 2A. The program outside the enclave 202 has access to some but not all of the memory. That is, the enclave 200 and the program outside the enclave share some memory. In an example, threads executing inside the enclave are trusted whereas threads executing in the program outside the enclave are not trusted. In an example, the technology of the present disclosure enables a thread inside the enclave (referred to herein as a green thread G for clarity) to allocate some memory within the shared memory by using an allocator. In an example, the technology of the present disclosure enables a thread inside the enclave (a G thread) to deallocate some memory within the shared memory which has been allocated by a thread in the program outside the enclave (an R thread). The technology is symmetric. So a thread in the program outside the enclave (R thread) is able to deallocate some memory in the enclave which was allocated by the G thread.

In an enclave system such as that shown in FIG. 2A, the code running inside an enclave can see and modify the memory outside and the program 202 outside is responsible for all untrusted communication (for example, fetching encrypted data from a disk or over a network). It is possible for the program 202 outside the enclave to pre-allocate memory buffers and rings that the enclave 200 can use to communicate, but it is often more convenient for the enclave 200 to be able to allocate arbitrary memory objects.

The technology of the present disclosure enables the enclave 200 to cheaply allocate memory outside of the enclave 200 (where cheaply means with fewer computing resources). Thus it is also comparatively easy for the allocator to dynamically adjust the amount of memory used by the enclave 200 for communication, rather than pre-allocating everything. For this to be efficient, the untrusted code running outside of the enclave 200 is able to free the memory with low overhead. The technology of the present disclosure enables the program 202 outside of the enclave to free the memory with low overhead.

Figure 2B:
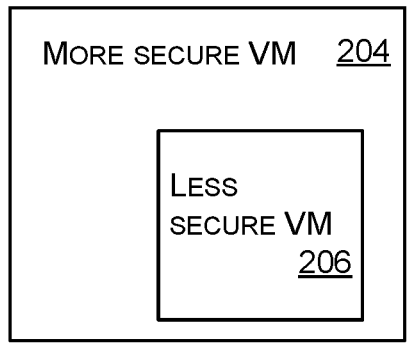
FIG. 2B is a schematic diagram of a more secure virtual machine and a less secure virtual machine.

FIG. 2B is a schematic diagram of a more secure virtual machine 204 and a less secure virtual machine 206. The more secure virtual machine has memory depicted by the larger rectangle and the less secure virtual machine shares some but not all of that memory as indicated in FIG. 2B. This type of arrangement is found in some well-known operating systems where the kernel is split into two parts that are protected by the hypervisor. A less trusted virtual machine runs the main operating system and normal applications. The more secure virtual machine runs integrity and security services and is able to see memory owned by the less trusted virtual machine. The technology of the present disclosure removes some of the constraints on code running in the more secure virtual machine and makes it possible for the secure code to create complex data structures for the less secure code to consume.

Figure 2C:
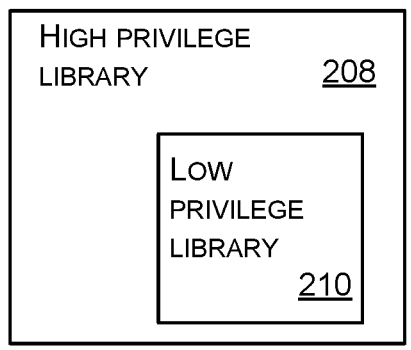
FIG. 2C is a schematic diagram of a high privilege library and a low privilege library.

FIG. 2C is a schematic diagram of a high privilege library compartment 208 and a lower privilege library compartment 210. The high privilege library compartment 208 has memory depicted by the larger rectangle and the less privileged library compartment 210 shares some but not all of that memory as indicated in FIG. 2C.

In a software compartmentalization arrangement, some part of a program runs with lower privilege. It is common to wish to move an existing library into a lower privilege to minimize attack surface. For example, image and video decoding libraries are typically written in unsafe languages and handle untrusted data so are a common vector for exploits. Running such a library with a very limited set of privileges makes this significantly safer.

There are several mechanisms that make it easy to enforce strong isolation, for example separate processes with shared memory, software-based fault isolation (SFI) sandboxes such as those used by WebAssembly (trade mark) implementations, and hardware isolation features. These impose a performance penalty to transition between the high privilege library compartment and the low privilege library compartment. Each technique can be used to make the whole of the untrusted component's memory visible to the trusted component.

This is sufficient as long as the library interface is implemented in terms of functions that take and return only simple (primitive) types. Unfortunately, this is rarely the case and most libraries expect users to construct or consume complex data structures. To improve the programming model for software compartmentalization, the technology of the present disclosure gives a lightweight ability for the high privilege component to be able to allocate memory inside the low privilege library and for both the low privilege library and high privilege library to be able to free this memory.

Figure 2D:
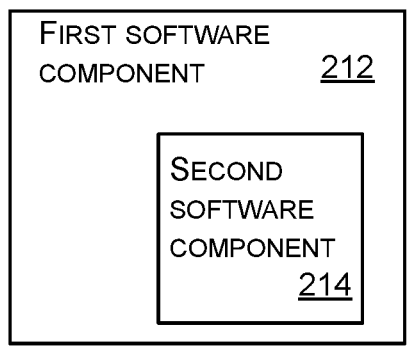
FIG. 2D is a schematic diagram of a first software component and a second software component.

FIG. 2D is a diagram of the general case, having a first software component 212 and a second software component 214 divided by a trust boundary (where the trust boundary is not illustrated in FIG. 2D). The first software component 212 has memory depicted by the larger rectangle and the second software component 214 shares some but not all of that memory as indicated in FIG. 2D. Using the message passing facility, which is in the shared memory, the technology of the present disclosure enables efficient and secure deallocation of memory by a thread, where the memory has been allocated by a different thread on the other side of the trust boundary.

Figure 3:
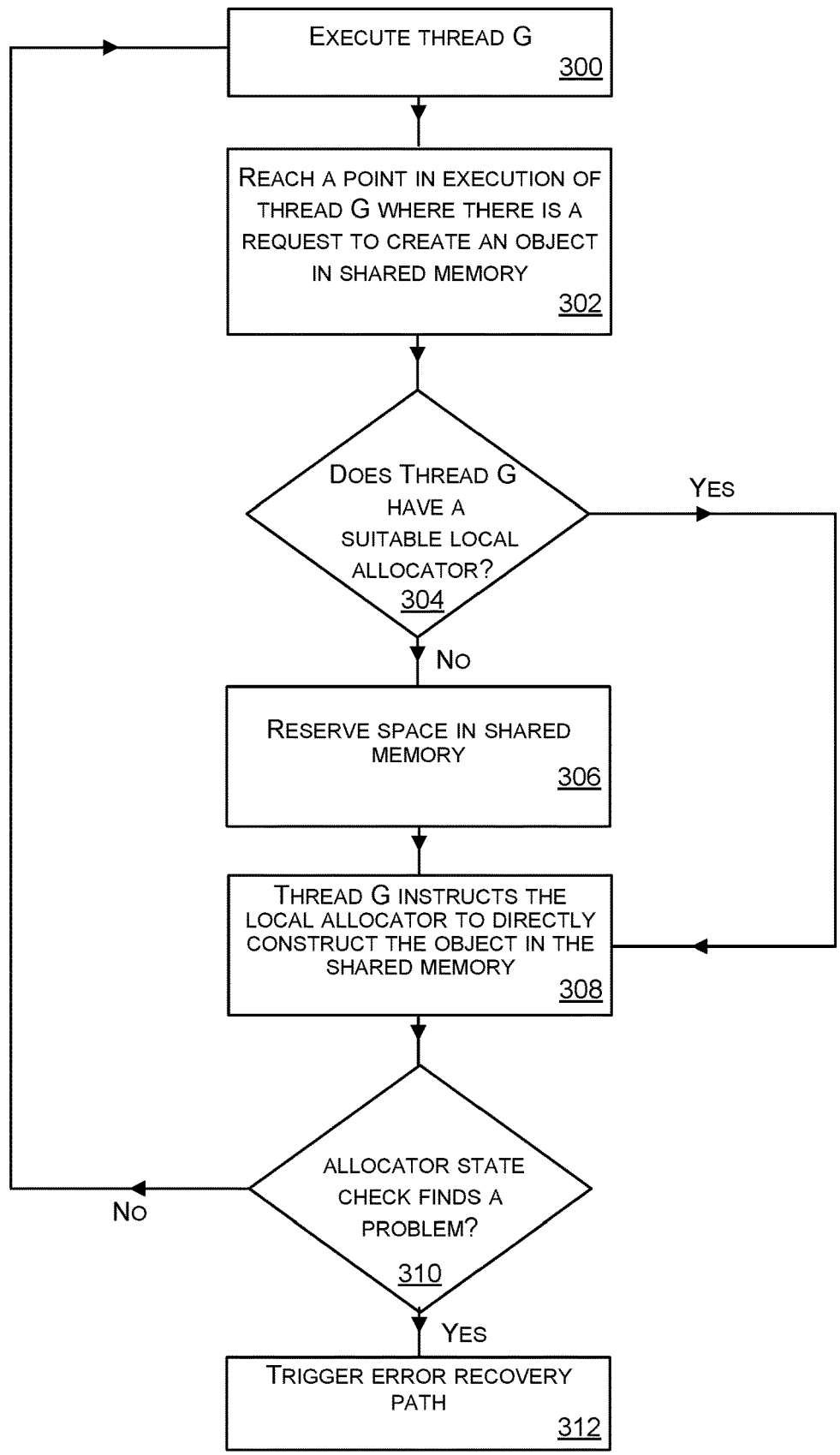
FIG. 3 is a flow diagram of a method of memory allocation where a thread on one side of a trust boundary allocates memory on the other side of the trust boundary.

FIG. 3 is a flow diagram of a method of memory allocation performed by a thread G which is on one side of a trust boundary in order to allocate memory on the other side of the trust boundary. FIG. 3 is described for the case where the thread G is on a more trusted side of the trust boundary. However, note that the method is symmetric and also works where the thread performing the method is on a less trusted side of the trust boundary. The method of FIG. 3 also operates for situations involving mutual distrust, where the thread performing the method is in a first software component and on the other side of the trust boundary is a second software component, where the first and second software components mutually distrust one another.

Thread G executes 300 on one side of the trust boundary, such as a more trusted side of the trust boundary. Thread G reaches a point in its execution where there is a request 302 to create an object in shared memory where the shared memory is shared with the other side of the trust boundary. Thread G checks 304 whether it already has a local allocator. A local allocator is an allocator which has its own arena (a data structure comprising virtual memory space which maps to physical memory) and metadata recording which blocks are currently allocated in the virtual memory space). In some examples, the virtual memory space of a local allocator maps to physical memory owned by the other side of the trust boundary. Note that in systems without virtual memory, such as embedded devices where there are overlapping memory protection unit (MPU)-protected regions for components, then a local allocator is a region of physical memory owned by the other side of the trust boundary. In a preferred example, most of the state of a local allocator is in private memory, not shared memory.

If there is no local allocator for thread G then thread G reserves 306 some space in the shared memory for a message queue to be used by the software on the other side of the trust boundary. In some examples the reservation is done using a shared pointer to a start of a region in the shared memory and an atomic operation. In other examples the reservation is done using a cross-trust boundary call which is expensive in terms of compute cycles and/or time but is not performed very often. The software on the other side of the trust boundary receives the cross trust boundary call, reserves some space in the shared memory and informs thread G.

If there is a local allocator for thread G, but the local allocator is too small to satisfy the allocation, then a cross-trust boundary synchronization operation is done to reserve some memory in the shared region.

Thread G instructs 308 the local allocator to directly construct the object in the shared memory. Because the local allocator already has an arena it is able to directly construct the object in the region of shared memory that it has reserved. The reservation step guarantees that no other allocator will try to allocate objects in that reserved region.

At check point 304, if the thread G already has a local allocator then the process moves to operation 308.

During operation 308 when the object is being constructed, thread G makes allocator state checks 310. That is, thread G checks 310 whether the local allocator harmed memory on the same side of the trust boundary as thread G. The check 310 comprises checking that every address used based on data in the shared memory region is, itself, in the shared memory region. The check is done by ensuring that any memory accesses that occur as part of the process of allocation and which depend on untrusted data are within the shared memory region. If the check finds that memory outside of the shared region would be read of written as a result of corrupted or malicious data in the shared region then an error recovery path is triggered 312. If the check 310 finds no problem, the process returns to operation 300 and thread G continues to execute.

If the local allocator harms memory on the same side of the trust boundary as the local allocator there is no problem since the software on the same side of the trust boundary as the local allocator is untrusted and it is expected that it may corrupt memory on its side of the trust boundary.

The method of FIG. 3 describes memory allocation performed by a thread to allocate memory on the other side of the trust boundary. The case where a thread allocates memory on the same side of the trust boundary as the thread is conventional and so is not described here.

In an example, every thread has an allocator for local allocation, but there is a single allocator for a first software component to allocate memory owned by the second software component. The single allocator of the first software component is protected by a lock and is accessed by multiple threads.

In another example, each thread of the first software component has a local allocator and a remote allocator (so two instances of a memory allocator).

Figure 4:
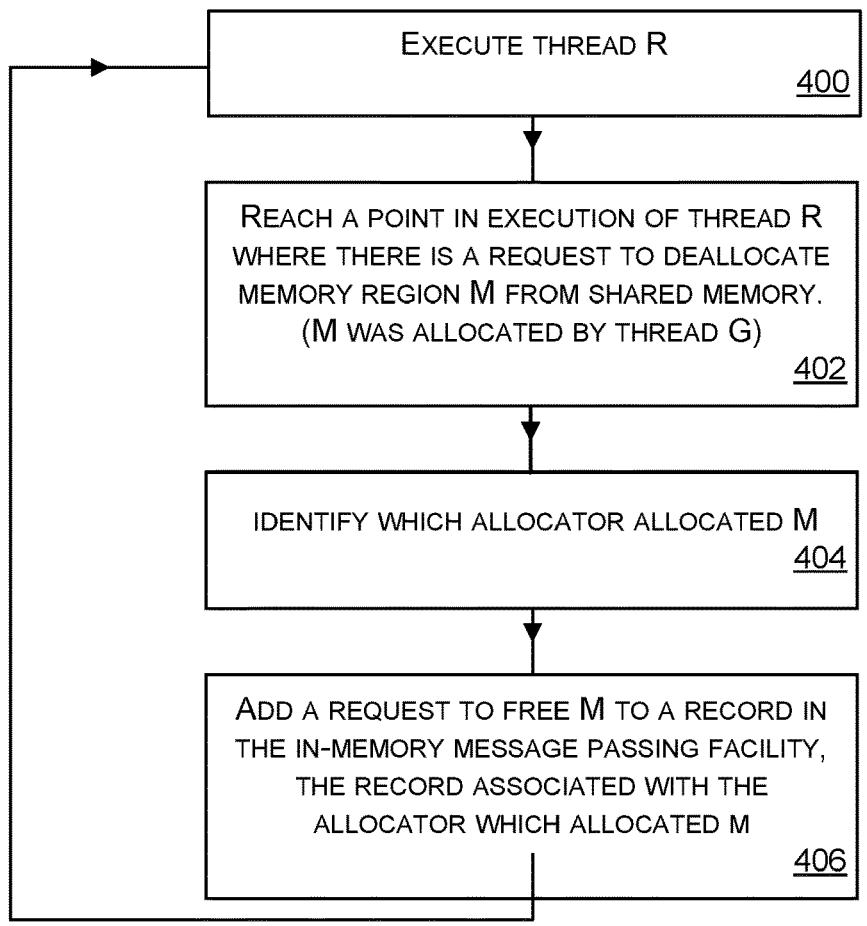
FIG. 4 is a flow diagram of a method performed by a thread on the other side of the trust boundary deallocates memory.

FIG. 4 is a flow diagram of a method performed by a thread R in the other side of the trust boundary to thread G. In an example, thread R is part of untrusted code but this is an example only as thread R can be any thread on the other side of the trust boundary from thread G.

Thread R executes 400 and reaches 402 a point in its execution where there is a request to deallocate memory region M from shared memory. Memory region M was allocated by thread G. The thread R identifies 404 which allocator allocated M. In this example, thread R finds that the local allocator of thread G allocated M. The identification is done by looking up in a data structure (referred to herein as an allocator index). In some examples the allocator index is maintained by the first software component in a shared memory region to which the second software component has access. In some examples, the first software component has a copy of the allocator index and the second software component has a copy of the allocator index and these copies are synchronized during operation 306 of FIG. 3.

Thread R adds a request to free M to a record in the in-memory message passing facility. The request is made immediately or is put into a batch and made as part of a batch of requests. More detail about batching and situations when batching of request is not appropriate is given below.

The record is associated with the allocator which allocated M. In an example, the record is a queue and there is one queue for each allocator. The request to free M is added to the queue of the allocator which allocated M. The thread R then proceeds to execute 400 and the process repeats.

Figure 5:
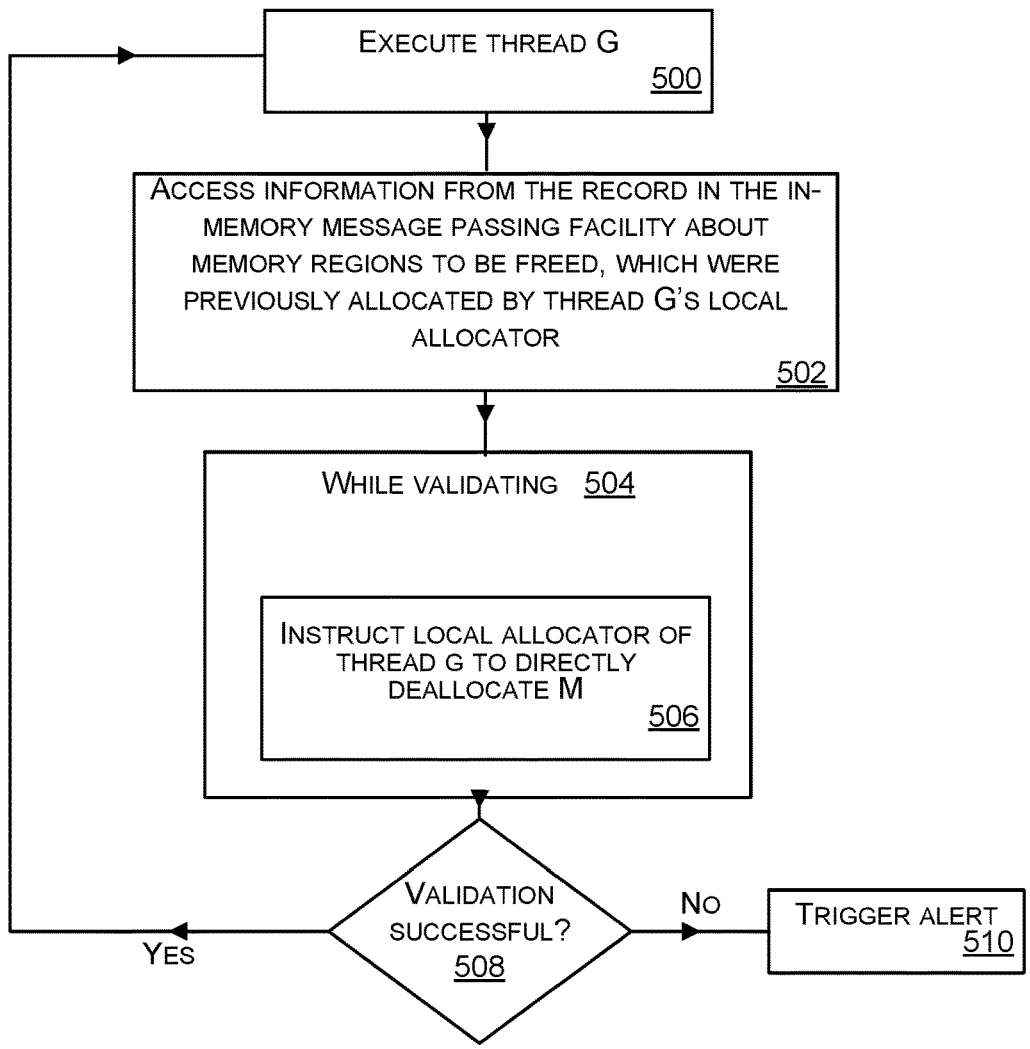
FIG. 5 is a flow diagram of a method performed by a thread on one side of the trust boundary deallocating memory and carrying out validation.

FIG. 5 is a flow diagram of a method performed by the thread which originally allocated M. In the example of FIG. 4, the thread which originally allocated M is thread G. Thread G is in the other side of the trust boundary to thread R. Thread G is executing 500. It looks in the record in the in-memory message passing facility to find which requests to free memory regions are waiting for it. It finds a request to deallocate M which is waiting for thread G since thread G previously allocated M. Thread G takes the request and instructs 506 the local allocator of thread G to directly deallocate M. Since the local allocator carries out the deallocation directly there is no cross-trust boundary call and the deallocation is efficient.

Operation 506 is carried out while thread G validates 504 by making a range check that the memory accesses performed during operation 506 are within the shared range. If the shared memory region is not contiguous there are a plurality of ranges to check everything points inside the shared memory.

If the validation fails then an alert is triggered 510 and/or memory is cleared. If the validation is successful then the process returns to operation 500 where thread G executes.

In the mutual distrust case, where the first and second software components distrust one another, the method of FIG. 5 is symmetric as is the method of FIG. 4. That is, where thread G performs the method of FIG. 4 then thread R performs the method of FIG. 5. If there is a hierarchical trust relationship then the untrusted component does not need to perform validation (it trusts the other component) and it is free to do a lot more caching of messages.

The technology of the present disclosure uses a message passing facility that is implemented in the shared memory. In an example the message passing facility is implement using only the shared memory.

Figure 6:
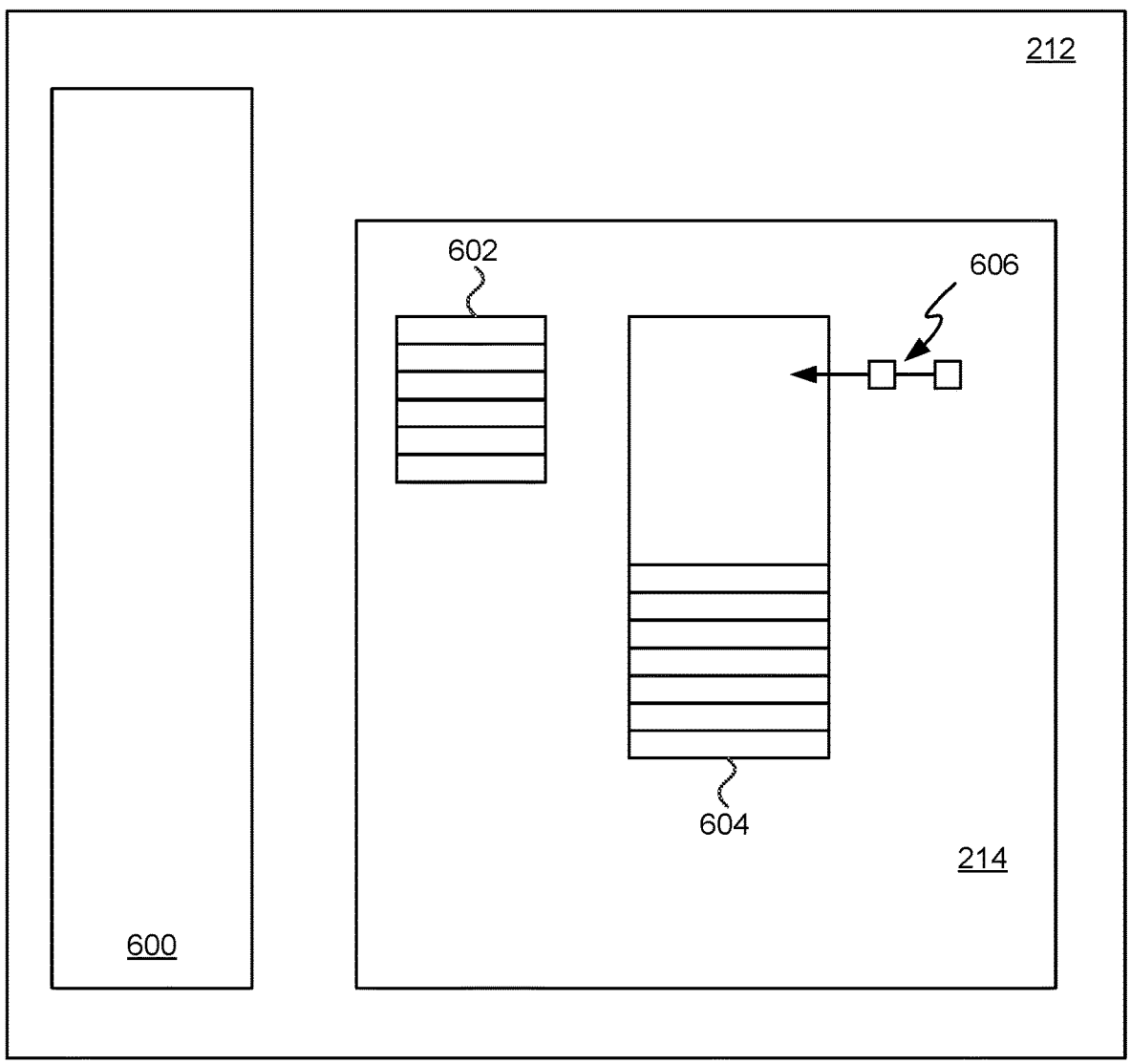
FIG. 6 is a schematic diagram of data structures used in one example of a message passing mechanism.

An example of the message passing facility is now given with reference to FIG. 6 and note that this is one example only and others are possible.

FIG. 6 shows a first software component 212 and a second software component 214 as in FIG. 2D which are separated by a trust boundary. The first software component 212 is in memory schematically illustrated as rectangle 212 and the second software component shares some of that memory as illustrated by rectangle 214 which is within rectangle 212.

The second software component comprises a plurality of memory allocators and in FIG. 6 one memory allocator 604 is shown. The other memory allocators are omitted from FIG. 6 for clarity. Each allocator is assigned a separate arena.

A message passing facility is implemented in the shared memory and comprises a plurality of queues, one queue 606 for each memory allocator 604.

An allocator index 602 is provided. The allocator index 602 is a data structure used for finding memory allocators as it stores information about which allocator allocated which memory regions. In an example an allocator index 602 is an array indexed by the most significant bits of the virtual address of allocated memory regions. The most significant bits indicate the kind of the allocation and using the kind of the allocation it is possible to find metadata indicating the identity of the allocator, as an offset within the chunk. In another example an allocator index 602 is a map from the high bits of the virtual address of a hardware message passing facility of a supercomputer.

In some examples, such as the enclave example of FIG. 2A, a second allocator index 600 is present in the memory on the other side of the trust boundary and is kept in synchronization with the allocator index 602.

In other examples, such as the library compartmentalization example of FIG. 2C there is no second allocator index and the allocator index 602 is a single canonical allocator index which has information about memory ranges available to each of the library compartments. Any updates to the canonical allocator index from unprivileged library compartments are proxied to the privileged code, which updates both the canonical allocator index and the library compartment's view (after validating updates). The allocator index is updated when a new chunk is allocated so that the cost of cross-trust boundary calls is amortized.

In the method of FIG. 4, in which thread G from the first software component 212 allocates a memory region in the shared memory, the thread G has a local allocator 604 in the shared memory. The thread G is able to use the local allocator 604 to directly allocate an object in the shared memory without the need for making a cross trust boundary call.

In the method of FIG. 5, in which thread R from the second software component 214 wants to deallocate a memory region M which was allocated by thread G, then thread R uses the allocator index 602 to identify which thread allocated memory region M. Thread R looks up a reference to memory region M in the allocator index 602 and finds the identity of the allocator which allocated memory region M. The allocator index 602 is populated with data available in the second software component without the need to make cross trust boundary calls.

In some, but not all examples, there is a second allocator index 600 outside the shared memory. The second allocator index potentially has information that is not known to the allocator index 602 in the shared memory region, because of the location of the second allocator index. However, a synchronization method is used to synchronize the allocator indexes. The synchronization method uses cross trust boundary calls but these are infrequent and so do not introduce undue burden and/or delay. In some examples, the cross trust boundary calls for synchronization are part of the same cross trust boundary call used to reserve a region of the shared memory for an allocator in the method of FIG. 3. The second allocator index is used in the enclave example of FIG. 2A. When the method of FIG. 5 is performed by the program 202 outside the enclave, only the allocator index outside the enclave (allocator index 602) is visible and so that is the only one checked. The program 202 running outside the enclave cannot see memory within the enclave 200 and so cannot free memory within the enclave 200. When freeing memory from within the enclave 200, a thread in the enclave carries out the method of FIG. 5. It looks up in the second allocator index 600 and checks the other allocator index 602 if the memory is outside enclave range.

Thread R identifies (from the allocator index) that it was thread G which allocated M. Thread R then puts an entry into queue 606 of thread G's local allocator 604. In order for thread R to put an entry into queue 606 of thread G's local allocator 604 atomic operations in memory are carried out but no cross trust boundary calls. Thus the process of putting entries in the queues is very cost effective. In a preferred example a plurality of requests to put entries in queue 606 are collected and sent in a batch to the queue 606 in order to give efficiency.

In the library compartmentalization example of FIG. 2C batching of requests to put entries in queue 606 causes problems when a library compartment exits. When the library compartment exits, then pointers to memory owned by it are to be freed before the memory can be unmapped. If the pointers to the memory owned by the library compartment are cached in other allocators (in the queues) the it takes an unbounded amount of time to free the pointers. Therefore, for deallocations of memory owned by untrusted code from trusted code the entries are added to the remote queue immediately in order to avoid the unbounded time.

The entry comprises a request to free memory region M. In an example each queue such as queue 606 is a multi-producer, single-consumer lockless queue. The queue is multi-producer since a plurality of different threads are able to put entries into the queue. The queue is single-consumer since a single allocator takes items from the queue. The queue is lock-less since no locks are placed on the queue whilst it is in operation.

In the method of FIG. 6, in which thread G takes items from queue 606, thread G takes items from the queue 606 which are memory regions for it to deallocate and it uses the local allocator 604 to deallocate those. Retrieving the messages from the queue is achieved in a single atomic operation and so is very efficient. Since local deallocator 604 is used there is no cross trust boundary call involved.

In the method of FIG. 6, the thread G carries out validation. Thread G validates that memory access to memory owned by data structures related to memory allocation within the shared memory are within the shared memory. The validation is typically a simple range check that the memory accesses are within the shared range. If the shared memory region is not contiguous there are a plurality of ranges to check.

Previous allocators which support multiple threads typically use locks to lock data structures and then manipulate them in order to deal with contention. However, use of locks is problematic for the type of highly asynchronous, cross trust boundary situation of the present disclosure. One can't necessarily trust the lock implementation even if it is an in-memory spin lock. It would be very easy to maliciously lock the data structure and never unlock it, or unlock the data structure whilst it is being modified, or unlock the data structure whilst another entity is modifying it.

The in-memory message passing facility and the validation process of the disclosure operate in an unconventional manner to achieve memory deallocation across a trust boundary between two software components in an efficient manner.

The in-memory message passing facility and the validation process improve the functioning of the underlying computing device by enabling efficient deallocation of memory across a trust boundary between two software components.

Figure 7:
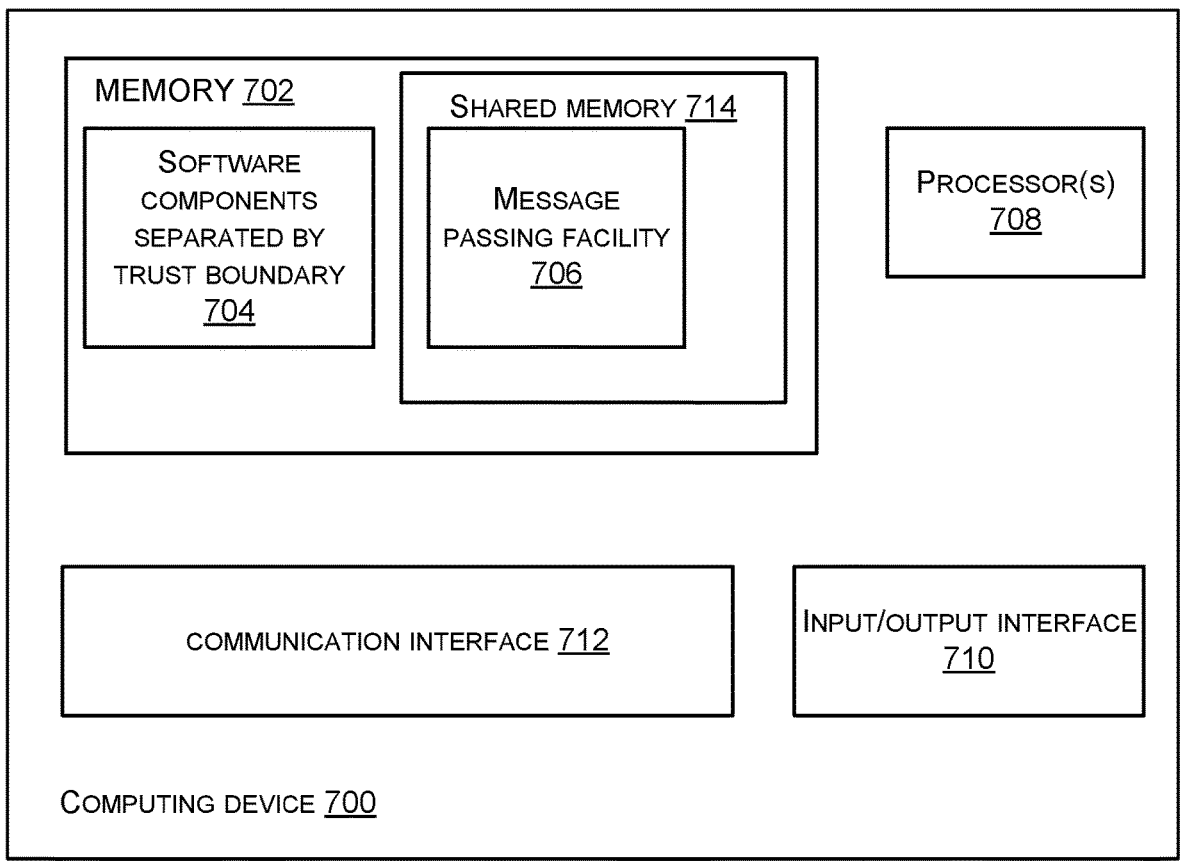
FIG. 7 illustrates an exemplary computing-based device in which embodiments of memory deallocation across a trust boundary are implemented.

FIG. 7 illustrates various components of an exemplary computing-based device 700 which are implemented as any form of a computing and/or electronic device, and in which embodiments of functionality for memory deallocation across a trust boundary are implemented in some examples.

Computing-based device 700 comprises one or more processors 708 which are microprocessors, controllers or any other suitable type of processors for processing computer executable instructions to control the operation of the device in order to deallocate memory across a trust boundary between two software components. In some examples, for example where a system on a chip architecture is used, the processors 708 include one or more fixed function blocks (also referred to as accelerators) which implement a part of the method of any of FIGS. 3 to 5 in hardware (rather than software or firmware).

The computer executable instructions are provided using any computer-readable media that is accessible by computing based device 700. Computer-readable media includes, for example, computer storage media such as memory 702 and communications media. Memory 702 stores two or more software components 704 separated by a trust boundary and memory 702 also stores message passing facility 706.

Computer storage media, such as memory 702, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 702) is shown within the computing-based device 700 it will be appreciated that the storage is, in some examples, distributed or located remotely and accessed via a network or other communication link (e.g. using communication interface 712).

The computing-based device 700 also comprises an input/output interface 710 arranged to output display information to a display device which may be separate from or integral to the computing-based device 700. The display information may provide a graphical user interface. The input/output controller interface 710 is also arranged to receive and process input from one or more devices, such as a user input device (e.g. a mouse, keyboard, camera, microphone or other sensor). In some examples the user input device detects voice input, user gestures or other user actions and provides a natural user interface (NUI). In an embodiment the display device also acts as the user input device if it is a touch sensitive display device. The input/output interface 710 outputs data to devices other than the display device in some examples, e.g. a locally connected printing device.

Alternatively or in addition to the other examples described herein, examples include any combination of the following:

Clause A. A method of memory deallocation across a trust boundary between a first software component and at least a second software component, the method comprising:

sharing some memory between the first and second software components;

implementing an in-memory message passing facility using the shared memory;

using the first software component to deallocate memory from the shared memory which has been allocated by the second software component, by:

taking at least one allocation to be freed from the message passing facility;

freeing the at least one allocation using a local deallocation mechanism while validating that memory access to memory owned by data structures related to memory allocation within the shared memory are within the shared memory. By using the in-memory message passing facility and the validation it is possible to efficiency and securely deallocate memory across a trust boundary. Cross trust boundary calls which are expensive in compute cycles and/or time are minimized. By using the in-memory message passing facility and validation both software components are able to run concurrently without needing to synchronize for memory allocation events.

Clause B The method of clause A wherein a thread in the first software component takes the at least one allocation to be freed from the message passing facility, and the thread frees the at least one allocation using a local deallocation mechanism which is an allocator of the thread, the allocator owning a chunk of memory in the shared memory. By using a local allocator cross trust boundary calls are not needed.

Clause C The method of clause A or clause B which is carried out without a cross-trust boundary call between the first and second software components.

Clause D The method of any preceding clause comprising taking the at least one allocation to be freed from a queue in the message passing facility, the queue being associated with an allocator which allocated the allocation to be freed. Since the queue is associated in this manner safe and efficient memory deallocation is facilitated.

Clause E The method of any preceding clause which is performed by a thread and wherein the allocation to be freed has been identified as an allocation previously made by the thread.

Clause F The method of any preceding clause wherein the validating is done by.

Clause G The method of any preceding clause wherein the allocation to be freed has been added to the message passing facility by a thread of the second software component.

Clause H The method of clause G wherein the allocation to be freed is added to the message passing facility as part of a batch of allocations to be freed.

Clause I The method of clause G wherein the allocation to be freed has been added to a queue selected from a plurality of queues at the message passing facility, the queue being associated with an allocator which allocated the allocation to be freed.

Clause J The method of clause I wherein the queue has been selected by using an allocator index to identify the allocator which allocated the allocation to be freed.

Clause K The method of any preceding clause wherein the in-memory message passing facility is lockless. Using locks is problematic since the lock can be exploited by a malicious party. Using locks imposes a high overhead if implemented by a lock manager in a trusted component.

Clause L The method of any preceding clause wherein the in-memory message passing facility comprises a multi-producer, single-consumer queue. Using this type of queue gives efficiencies. In another example the in-memory message passing facility comprises a multi-producer, multi-consumer queue.

Clause M The method of any preceding clause wherein the in-memory message passing facility comprises an allocator index in the shared memory and a second allocator index in memory of the first software component which is not part of the shared memory.

Clause N The method of any of clauses A to L wherein the in-memory message passing facility comprises a single canonical allocator index which maps a different range of memory regions to each of the software components.

Clause O The method of any of clauses A to L wherein the first software component is an enclave and the second software component is a program outside the enclave and wherein the method comprises maintaining two allocator indexes, one in the enclave and one outside the enclave, and synchronizing the allocator indexes.

In some examples there are more than two software components. At least two of the software components share an allocator index and at least two of the software components each have their own synchronized allocator index.

In some examples there are three software components which all share the same shared memory region in a mutual distrust setting and all have their own private part of an allocator index plus a shared part of the allocator index.

Clause P The method of any of clauses A to L wherein the software components are library compartments and wherein the allocation to be freed is added to the message passing facility immediately.

Clause Q The method of any of clauses A to L wherein the first software component is a virtual machine and the second software component is a virtual machine which is less secure than the first software component.

Clause R An apparatus comprising:

a first software component and a second software component separated by a trust boundary:

memory, at least some of the memory being shared between the first and second software components;

an in-memory message passing facility implemented using the shared memory; and wherein the first software component is configured to deallocate memory from the shared memory which has been allocated by the second software component, by making a range check that the memory accesses performed during the freeing of the at least one allocation are within the shared range.

taking at least one allocation to be freed from the message passing facility; and freeing the at least one allocation using a local deallocation mechanism while validating that memory access to memory owned by data structures related to memory allocation within the shared memory are within the shared memory.

Clause S The apparatus of clause R wherein the first software component is an enclave and the second software component is outside the enclave.

Clause T A method performed by an operating system comprising a first library compartment and a second library compartment, the method comprising:

sharing some memory between the first and second library compartments;

implementing an in-memory message passing facility using the shared memory;

using the first library compartment to deallocate memory from the shared memory which has been allocated by the second library compartment, by:

taking at least one allocation to be freed from the message passing facility;

freeing the at least one allocation using a local deallocation mechanism while validating that memory access to memory owned by data structures related to memory allocation within the shared memory are within the shared memory.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

This acknowledges that software is a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

The term 'subset' is used herein to refer to a proper subset such that a subset of a set does not comprise all the elements of the set (i.e. at least one of the elements of the set is missing from the subset).

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

What is claimed is:

1. A method of memory deallocation between a first software component and at least a second software component, the method comprising:

implementing an in-memory message passing facility using shared memory between the first and second software components, wherein the first software component is separated from the second software component by a trust boundary, wherein the in-memory message passing facility includes a plurality of queues, wherein the first software component is associated with a first queue of the plurality of queues and the second software component is associated with a second queue of the plurality of queues;

using the first software component to deallocate memory from the shared memory which has been allocated by the second software component, at least by adding a request to free a memory allocation to the second queue in the in-memory message passing facility; and using the second software component to:
take the request to free the memory allocation from the message passing facility; and
free the memory allocation using a local deallocation mechanism.

2. The method of claim 1 wherein:
a thread in the first software component takes the request to free the memory allocation from the message passing facility, and
the thread frees the memory allocation using a local deallocation mechanism which is an allocator of the thread while validating that memory access to memory owned by data structures related to the memory allocation within the shared memory are within the shared memory, the allocator owning a chunk of memory in the shared memory.

3. The method of claim 2 which is carried out across the trust boundary without a cross-trust boundary call between the first and second software components.

4. The method of claim 1 further comprising taking the request to free the memory allocation from the plurality of queues in the message passing facility, the plurality of queues being associated with an allocator which allocated the allocation to be freed.

5. The method of claim 1 which is performed by a thread and wherein the allocation to be freed has been identified as an allocation previously made by the thread.

6. The method of claim 1 further comprising validating that memory access to memory owned by data structures related to memory allocation within the shared memory are within the shared memory, at least by making a range check that the memory accesses performed during the freeing of the memory allocation are within a shared range.

7. The method of claim 1 wherein the allocation to be freed has been added to the message passing facility by a thread of the second software component.

8. The method of claim 7 wherein the allocation to be freed is added to the message passing facility as part of a batch of allocations to be freed.

9. The method of claim 7 wherein the allocation to be freed has been added to the second queue, the queue being associated with an allocator which allocated the allocation to be freed.

10. The method of claim 9 further comprising selecting the second queue using an allocator index to identify the allocator which allocated the allocation to be freed.

11. The method of claim 1 wherein the in-memory message passing facility is lockless.

12. The method of claim 1 wherein each queue of the plurality of queues comprises a multi-producer, single-consumer queue.

13. The method of claim 1 wherein the in-memory message passing facility comprises an allocator index in the shared memory and a second allocator index in memory of the first software component which is not part of the shared memory.

14. The method of claim 1 wherein the in-memory message passing facility comprises a single canonical allocator index which maps a different range of memory regions to each of the software components.

15. The method of claim 1 wherein the first software component is an enclave and the second software component is a program outside the enclave and wherein the method comprises maintaining two allocator indexes, one in the enclave and one outside the enclave, and synchronizing the allocator indexes.

16. The method of claim 1 wherein:
the first software component and the second software component are each library compartments separated by the trust boundary,
the trust boundary defines the first software component and the second software component as having different privileges,
the first software component has a first privilege, the second software component has a second privilege, and the first privilege is higher than the second privilege, and
the allocation to be freed is added to the message passing facility immediately.

17. The method of claim 1 wherein the first software component is a virtual machine and the second software component is a virtual machine which is less secure than the first software component.

18. An apparatus comprising:
a first software component and a second software component separated by a trust boundary;
a memory, at least some of the memory being shared between the first and second software components;
an in-memory message passing facility implemented using the shared memory between the first and second software components, wherein the first software component is separated from the second software component by a trust boundary, wherein the in-memory message passing facility includes a plurality of queues, wherein the first software component is associated with a first queue of the plurality of queues and the second software component is associated with a second queue of the plurality of queues; and
wherein the first software component is configured to deallocate memory from the shared memory which has been allocated by the second software component, at least by adding a request to free a memory allocation to the second queue in the in-memory message passing facility; and
using the second software component to:
take the request to free the memory allocation from the message passing facility; and
free the memory allocation using a local deallocation mechanism.

19. The apparatus of claim 18 wherein the first software component is an enclave and the second software component is outside the enclave.

20. A method performed by an operating system comprising a first library compartment and a second library compartment, the method comprising:
implementing an in-memory message passing facility using shared memory between the first and second library compartments, wherein the first library compartment is separated from the second library compartment by a trust boundary, wherein the in-memory message passing facility includes a plurality of queues, and wherein the first library compartment is associated with a first queue of the plurality of queues and the second library compartment is associated with a second queue of the plurality of queues;
using the first library compartment to deallocate memory from the shared memory which has been allocated by the second library compartment, at least by adding a request to free a memory allocation to the second queue in the in-memory message passing facility; and
using the second library compartment to:
take the request to free the memory allocation from the message passing facility; and
free the memory allocation using a local deallocation mechanism.

* * * * *